United States Patent
Suzart et al.

(10) Patent No.: US 10,472,561 B2
(45) Date of Patent: Nov. 12, 2019

(54) CONTROLLING PROPPANT FLOWBACK USING RESIN CHEMISTRY FOR ACID FRACTURING

(71) Applicant: Halliburton Energy Services, Inc., Houston, TX (US)

(72) Inventors: Joao Walter Pereira Suzart, Houston, TX (US); Prasad Baburao Karadkar, Houston, TX (US); Anupom Sabhapondit, Houston, TX (US); Bilal Zoghbi, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/072,769

(22) PCT Filed: Mar. 2, 2016

(86) PCT No.: PCT/US2016/020465
§ 371 (c)(1),
(2) Date: Jul. 25, 2018

(87) PCT Pub. No.: WO2017/151124
PCT Pub. Date: Sep. 8, 2017

(65) Prior Publication Data
US 2019/0040309 A1    Feb. 7, 2019

(51) Int. Cl.
*E21B 43/267* (2006.01)
*C09K 8/74* (2006.01)
*C09K 8/66* (2006.01)
*C09K 8/80* (2006.01)

(52) U.S. Cl.
CPC ............ *C09K 8/74* (2013.01); *C09K 8/665* (2013.01); *C09K 8/805* (2013.01); *E21B 43/267* (2013.01)

(58) Field of Classification Search
CPC .......... C09K 8/74; C09K 8/805; E21B 43/267
See application file for complete search history.

(56) References Cited

U.S. PATENT DOCUMENTS

| | | | |
|---|---|---|---|
| 5,633,220 A * | 5/1997 | Cawiezel | C09K 8/64 507/117 |
| 2006/0283591 A1* | 12/2006 | Willberg | C09K 8/68 166/280.1 |
| 2008/0179062 A1 | 7/2008 | Watkins et al. | |
| 2010/0163233 A1 | 7/2010 | Abad et al. | |
| 2011/0034583 A1 | 2/2011 | Bismarck et al. | |
| 2014/0290943 A1* | 10/2014 | Ladva | E21B 43/267 166/280.1 |
| 2014/0367100 A1 | 12/2014 | Oliveira et al. | |
| 2015/0021022 A1* | 1/2015 | Ladva | C09K 8/805 166/276 |
| 2016/0153273 A1* | 6/2016 | Nguyen | E21B 43/267 166/280.1 |
| 2016/0264849 A1* | 9/2016 | Oliveira | C09K 8/36 |

OTHER PUBLICATIONS

International Search Report and Written Opinion for PCT/US2016/020465 dated Nov. 21, 2016.
OTC-24332 "Invert Emulsion Acid for Simultaneous Acid and Proppant Fracturing" Oliveira et al. 2013.
Carbonate Completion Acid System dated Aug. 2012.
BaraVis IE-570 dated 2017.

* cited by examiner

*Primary Examiner* — Silvana C Runyan
(74) *Attorney, Agent, or Firm* — Thomas Rooney; C. Tumey Law Group PLLC

(57) ABSTRACT

A method for wellbore stimulation of a subterranean formation that includes preparing an emulsified acid, preparing a resin coated proppant, combining the emulsified acid and the resin coated proppant, mixing to form an acid fracturing slurry and performing a fracturing stimulation of a subterranean formation with the acid fracturing slurry containing the resin coated proppant.

17 Claims, 2 Drawing Sheets

Carbonate Emulsified Acid (CEA) 26% HCl System as a Base Fluid

The Epoxy Resin Coated Proppant After Curing

Viscosified Carbonate Emulsified Acid System
After Treating With Expedite Coated Proppant

CONTROLLING PROPPANT FLOWBACK USING RESIN CHEMISTRY FOR ACID FRACTURING

CROSS-REFERENCE TO RELATED APPLICATIONS

None.

FIELD

The present invention generally relates to methods for wellbore stimulation of a subterranean formation, such as with resin coated proppant laden acid fracturing.

BACKGROUND

Hydraulic fracturing is a process commonly used to increase the flow of fluids, such as oil and gas, from a portion of a subterranean formation. Hydraulic fracturing operations generally involve placing a fracturing fluid into a formation or zone at a rate and pressure sufficient to cause the formation to break and form one or more fractures. The fracturing fluids provide two functions, the first is to provide the pressure needed to fracture the formation and the second is to transport solid particles into the fracture to keep the fracture open once the pressure is released and the overburden is permitted to settle. The solid particles, known as proppant or propping agents, can be of various types, such as graded sand, bauxite, ceramics, etc., which are suspended in the fracturing fluid and then deposited in the fractures. By keeping the fracture from fully closing, the proppant particulates aid in forming conductive paths through which fluids may flow. The degree of success of a fracturing operation depends, at least in part, upon fracture conductivity once the fracturing operation has ceased and production has commenced. The fracture conductivity depends, at least in part, on the consistency of the proppant within the fractured formation, which can be deteriorated if a significant amount of the proppant flows back out of the formation. Controlling the proppant flow-back during and after fracturing operations can be critical to the treatments success.

Acid fracturing is a process commonly used to increase the flow of fluids, such as oil and gas, from a portion of a subterranean formation. Acidizing operations are generally proppant free and involve acid etching on a fracture surface. This creates increased fracture conductivity only if the etching can help prevent fracture closure. Acid reacting with carbonate reservoirs can produce a wormholing effect of conductive channels, but the channels can collapse due to high closure stress and have very low retained conductivity.

To extend and sustain acid fracture conductivity the use of both proppant fracturing and acid fracturing methods can be combined. The use of retarded acids has shown advantages when the combined method of acid fracturing with proppant is used. In high stress formations and high production wells, proppant crushing and proppant flowback can present serious problems.

Thus, a need exists for a practical method of performing acid fracturing with proppant with a system that inhibits proppant crushing and flowback.

DETAILED DESCRIPTION

Disclosed herein are methods, formulations and systems used to stimulate a subterranean formation, such as performing acid fracturing with resin coated proppant that inhibits proppant crushing and flowback.

Disclosed herein is the use of resin chemistry to control proppant flow back and crushing. In an embodiment of the present invention a viscous emulsified acid can be used in a system for a combined acid and proppant fracturing operation, which can be referred to herein as a Prop Frac Acid treatment. In an embodiment, a novel high viscosified emulsified acid was prepared by adding viscosifier into Carbonate Emulsified Acid (CEA).

This process represents a new system, which utilizes an epoxy resin in an acid system. The system of epoxy resin coated proppant strengthens the proppant to withstand closure stress, reduce fine formation and facilitate the formation of a proppant structure, which resists flowback and fines transmission. The process can be used to treat a variety of subterranean formations, such as carbonate, dolomite and limestone formations.

In an embodiment a high viscous acid system is formed that will transport either synthetic proppant or natural sand. The high stress in certain formations, along with high production of gas and oil, leads to the use of a resin to coat the proppant in order to inhibit proppant flow back during and after the Prop Frac Acid job.

To validate the concept the following steps were taken:

A Carbonate Emulsified Acid (CEA) (26% acid strength) was prepared as a base acid. The oil phase characteristic of CEA was tested and validated by adding CEA drops into water.

Epoxy coating with 5% Expedite® 350 dry coating was performed on 20/40 High Strength Proppant (HSP).

The CEA was added into the Expedite coated proppant and stirred for 30 min in a water bath at 200° F.

The acid mixture with proppant was filtered with a 60 mesh sieve to remove the proppant.

A coated proppant sample was packed into a 2 inch×2 inch cubic mold for consolidation tests.

The filled cubic mold was kept in an oven at 300° F.

After a 12 hr cure period in the oven the block of proppant was tested on a press to measure the Unconfined Compressive Strength (UCS).

The filtered CEA acid from the 60 mesh sieve was tested for oil external phase characteristic by adding CEA drops into water. It showed that a drop of CEA sinks to the bottom which showed good emulsion after treating with resin coated proppant.

To increase the viscosity of the CEA to a consistency of a Cross-Linked fluid, 10 gpt BDF-570 viscosifier was added while mixing in a Warring blender.

Instantly viscosity was built up, which shows the proppant carrying capacity of a viscous CEA.

Figure 1:
FIG. 1 shows a photograph of an Emulsified Acid (EA) as a base fluid.

The resin coated proppant can be mixed with high viscus CEA by viscosifying CEA using BDF-570 as a viscosifier. Firstly, the CEA was prepared by the slow addition of the acid phase into the diesel phase under shear to get an oil external emulsion, then viscosifier; BDF-570 was added in CEA to get high viscosity as shown in FIG. 1. The oil external phase characteristic of prepared CEA was verified by performing a drop test, where a drop of CEA was added to water. The CEA drops remained contiguous, did not dissipate and settled down in the water.

Figure 2:
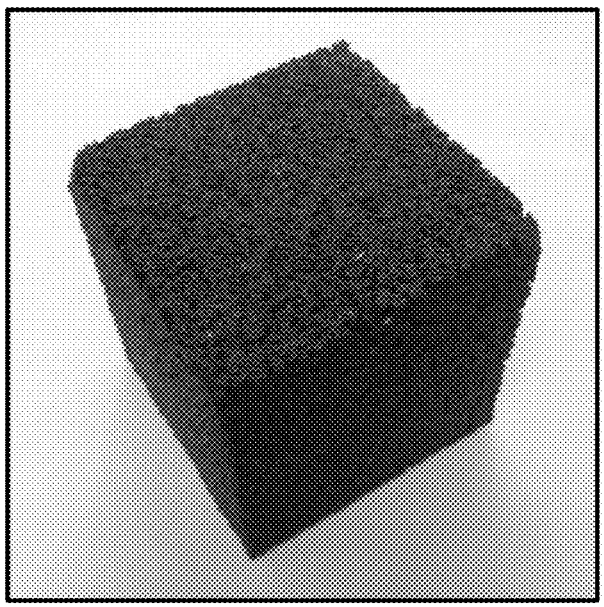
FIG. 2 is a photograph of a cubic mold of proppant for compressive strength testing.

Consolidation Tests:

A consolidation test was performed to check the ability of epoxy resin to coat proppant material, to form a proppant pack and to stabilize the proppant pack to inhibit flow back of the proppant in an acidic environment. A 5% epoxy resin was dry coated onto 20/40 HSP size proppant and mixed with the CEA. The mixture was kept in a water bath preheated to 200° F. for 30 min. Then the CEA mixture with proppant was filtered using a 60 mesh sieve. The coated proppant sample was packed into a 2 inch×2 inch cubic mold for consolidation. The filled cubic mold was heated in an oven at 300° F. After 12 hr, the resultant block of proppant was removed from the mold. FIG. 2 shows the epoxy resin coated proppant after curing. The block of proppant was then crushed on a press to measure its Unconfined Compressive Strength (UCS). UCS was measured to be 225 psi. This illustrates the ability of resin use in an acidic environment to stabilize the resultant proppant pack and thereby restrict proppant flow back.

Figure 3:
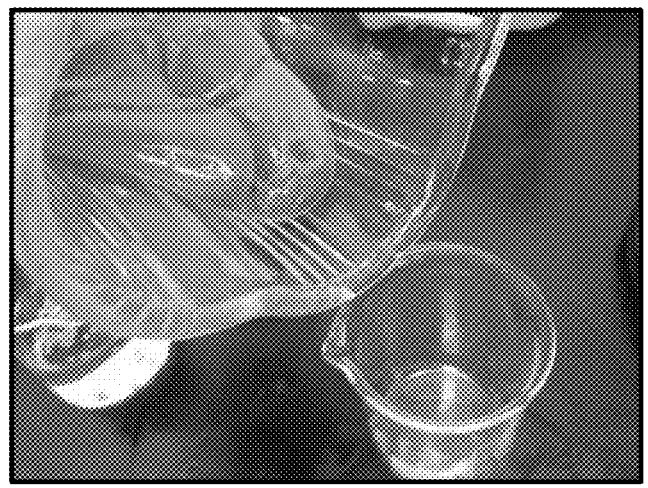
FIG. 3 is a photograph of a viscosified EA proppant system.

Viscosifying CEA:

To increase the viscosity of CEA after mixing with epoxy resin coated proppant, 10 gpt BDF-570 viscosifier was added in the CEA while being mixed in a Warring blender. An instant crosslinking occurred. The picture of the viscosified CEA is shown in FIG. 3. This shows that the use of resin coated proppant in an acidic environment does not have an appreciable effect on Prop Frac Acid crosslinking.

The concept to add epoxy resin for proppant flow back control in a Prop Frac Acid is new to the industry. The highly viscous EA has been found to not hinder the ability of the epoxy resin coated proppant and the use of resin coated proppant in an acidic environment has been found to not have an appreciable effect on crosslinking. The use of resin with a Prop Frac Acid treatment can stabilize pillar techniques and support conventional fractures in a carbonate formation. The resin provides strength and a mechanism to build support within a proppant matrix deposited during a Prop Frac Acid treatment.

The high viscous CEA fluid will not require additional breaker or additional treatment to break the fluid. On reacting with a carbonate formation, the fluid pH will increase and the emulsion will break, leading to a low viscosity fluid that can easily flow back and be recovered.

The use of a resin coated proppant during a Prop Frac Acid treatment will assist with fines control in a carbonate formation. Filling the wormholes created by acid fracturing with resin coated proppant can build sustainable conductive channels that resist collapse under high closure stress. The acid etch flow path created by a Prop Frac Acid treatment can give better formation clean up after flow back if the flow path is supported with the resin coated proppant, thereby increased flow conductivity.

In an embodiment, a method for wellbore stimulation of a subterranean formation includes preparing an emulsified acid and a resin coated proppant, combining the emulsified acid and resin coated proppant with mixing to form an acid fracturing slurry and performing a fracturing stimulation of a subterranean formation with the acid fracturing slurry containing the resin coated proppant.

In an embodiment the proppant is sand, ceramic or a HSP. In an embodiment the resin can be Expedite 350, which is commercially available from Halliburton or a different type of resin. The method can further include adding a viscosifier to the acid fracturing slurry, such as BDF-570.

The method can further include waiting a minimum of 1 hours cure time after the fracturing stimulation to allow the resin to cure. Optionally the cure time is at least 4 hours, at least 8 hours, at least 12 hours, or at least 16 hours.

In an embodiment, the present invention is a system used for wellbore stimulation of a subterranean formation. The system comprises a mixture of an emulsified acid and a resin coated proppant to form an acid fracturing slurry, wherein the acid fracturing slurry is used for fracturing stimulation of a subterranean formation. The acid aids in the formation of fractures and voids while the resin-coated proppant provides structure to keep the fractures open and provide increased flow conductivity. The resin-coated proppant also reduces proppant crushing and aids in restricting fines migration.

The various embodiments of the present invention can be joined in combination with other embodiments of the invention and the listed embodiments herein are not meant to limit the invention. All combinations of various embodiments of the invention are enabled, even if not given in a particular example herein.

While illustrative embodiments have been depicted and described, modifications thereof can be made by one skilled in the art without departing from the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.).

While compositions and methods are described in terms of "comprising," "containing," or "including" various components or steps, the compositions and methods can also "consist essentially of" or "consist of" the various components and steps. All numbers and ranges disclosed above may vary by some amount. Also, the terms in the claims have their plain, ordinary meaning unless otherwise explicitly and clearly defined by the patentee.

Depending on the context, all references herein to the "invention" may in some cases refer to certain specific embodiments only. In other cases it may refer to subject matter recited in one or more, but not necessarily all, of the claims. While the foregoing is directed to embodiments, versions and examples of the present invention, which are included to enable a person of ordinary skill in the art to make and use the inventions when the information in this patent is combined with available information and technology, the inventions are not limited to only these particular embodiments, versions and examples. Other and further embodiments, versions and examples of the invention may be devised without departing from the basic scope thereof and the scope thereof is determined by the claims that follow.

What is claimed is:

1. A method for wellbore stimulation of a subterranean formation, comprising:
   preparing an emulsified acid;
   preparing a resin coated proppant, the resin coated proppant comprising an epoxy resin coated on a proppant;
   combining the emulsified acid, the resin coated proppant, and a viscosifier, and mixing to form an acid fracturing slurry;
   performing a fracturing stimulation of the subterranean formation with the acid fracturing slurry containing the resin coated proppant;
   reacting the emulsified acid with the subterranean formation, increasing a pH of the acid fracturing slurry, and breaking the emulsified acid to produce a fluid with a lower viscosity than the emulsified acid; and flowing back the fluid with the lower viscosity than the emulsified acid.

2. The method of claim 1, wherein the proppant is sand.

3. The method of claim 1, wherein the proppant is a ceramic material.

4. The method of claim 1, wherein the resin coated proppant adheres together to restrict proppant flow back subsequent to the fracturing stimulation.

5. The method of claim 1 further comprising adding a viscosifier to the acid fracturing slurry.

6. The method of claim 1 further comprising waiting a minimum of 1 hours cure time after the fracturing stimulation to allow the resin to cure.

7. The method of claim 1, wherein the fracturing stimulation produces a fracture proppant pack within the subterranean formation having enhanced flow conductivity by keeping proppant pack intact as compared with an identical fracturing stimulation conducted with a proppant without a resin coating.

8. The method of claim 1, wherein the acid fracturing slurry does not need any breaker for post frac cleanup.

9. The method of claim 1, wherein the proppant can be pumped in pulses with the acid fracturing slurry to create highly conductive channels in the formation.

10. A system used for wellbore stimulation of a subterranean formation, comprising:
an emulsified acid;
a resin coated proppant;
a mixture of the emulsified acid and the resin coated proppant to form an acid fracturing slurry;
wherein the acid fracturing slurry is used for fracturing stimulation of a subterranean formation in which the emulsified acid is reacted with the subterranean formation which increases a pH of the mixture of the emulsified acid to cause the mixture of emulsified acid to break to produce a fluid with a lower viscosity than the mixture of emulsified acid.

11. The system of claim 10, wherein the resin coated proppant adheres together to restrict proppant flow back subsequent to the fracturing stimulation.

12. The system of claim 10, wherein the proppant is sand.

13. The system of claim 10, wherein the proppant is a ceramic material.

14. The system of claim 10, wherein the resin is any resin that can control proppant flow back.

15. The system of claim 10 further comprising a viscosifier added to the acid fracturing slurry.

16. The system of claim 10, wherein the emulsified acid is inorganic and organic acid.

17. The system of claim 10, wherein the acid fracturing slurry with resin coated proppant can remain stable up to 550° F.

preparing an emulsified acid;
preparing a resin coated proppant, the resin coated proppant comprising an epoxy resin coated on a proppant;
combining the emulsified acid, the resin coated proppant, and a viscosifier, and mixing to form an acid fracturing slurry;
performing a fracturing stimulation of the subterranean formation with the acid fracturing slurry containing the resin coated proppant;
reacting the emulsified acid with the subterranean formation, increasing a pH of the acid fracturing slurry, and breaking the emulsified acid to produce a fluid with a lower viscosity than the emulsified acid; and
flowing back the fluid with the lower viscosity than the emulsified acid.

* * * * *